US012749640B2

(12) United States Patent
Ogawa et al.

(10) Patent No.: US 12,749,640 B2
(45) Date of Patent: Sep. 29, 2026

(54) ELECTROMAGNETIC RELAY

(71) Applicant: OMRON Corporation, Kyoto (JP)

(72) Inventors: Shinichi Ogawa, Kyoto (JP); Ryota Minowa, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 204 days.

(21) Appl. No.: 18/696,363

(22) PCT Filed: Sep. 16, 2022

(86) PCT No.: PCT/JP2022/034675
§ 371 (c)(1),
(2) Date: Mar. 28, 2024

(87) PCT Pub. No.: WO2023/067958
PCT Pub. Date: Apr. 27, 2023

(65) Prior Publication Data
US 2024/0395487 A1 Nov. 28, 2024

(30) Foreign Application Priority Data
Oct. 22, 2021 (JP) ................................ 2021-173388

(51) Int. Cl.
*H01H 50/04* (2006.01)
*H01H 50/36* (2006.01)
*H01H 50/54* (2006.01)

(52) U.S. Cl.
CPC .......... *H01H 50/045* (2013.01); *H01H 50/36* (2013.01); *H01H 50/54* (2013.01)

(58) Field of Classification Search
CPC .................................................... H01H 50/045
USPC .................................................. 335/126, 131
See application file for complete search history.

(56) References Cited

U.S. PATENT DOCUMENTS 2,590,996 A * 4/1952 Miloche ................ H01H 50/24 335/129
3,244,836 A * 4/1966 Myers .................... H01H 51/08 200/324
3,739,311 A * 6/1973 Garbark .................... H01F 7/08 335/297

(Continued)

FOREIGN PATENT DOCUMENTS

JP S57-57431 A 4/1982
JP 2002-208338 A 7/2002

(Continued)

OTHER PUBLICATIONS

The International Search Report of International Application No. PCT/JP2022/034675 issued on Nov. 8, 2022.

(Continued)

*Primary Examiner* — Alexander Talpalatski
(74) *Attorney, Agent, or Firm* — SHINJYU GLOBAL IP

(57) ABSTRACT

An electromagnetic relay includes a fixed terminal, a movable contact piece, a contact case, and a drive device. The fixed terminal includes a fixed contact. The movable contact piece includes a movable contact facing the fixed contact. The contact case is configured to accommodate the fixed contact and the movable contact piece. The drive device includes a fixed iron core to be screw-fastened to the contact case, and a yoke to be held between the fixed iron core and the contact case.

10 Claims, 6 Drawing Sheets

(56) References Cited

U.S. PATENT DOCUMENTS

| | | | | | |
|---|---|---|---|---|---|
| 4,078,220 | A * | 3/1978 | Gallatin | H01H 50/163 | 200/302.1 |
| 4,346,359 | A * | 8/1982 | Pirner | H01H 51/06 | 335/203 |
| 4,616,202 | A * | 10/1986 | Kakizoe | H01H 50/546 | 335/121 |
| 5,519,369 | A * | 5/1996 | Hendel | H01H 50/34 | 335/250 |
| 6,300,851 | B1 * | 10/2001 | Baur | H01H 50/36 | 335/250 |
| 6,339,366 | B1 * | 1/2002 | Meisiek | F16K 31/0651 | 335/282 |
| 8,138,863 | B2 * | 3/2012 | Tanaka | H01H 50/38 | 335/131 |
| 10,395,874 | B2 * | 8/2019 | Wyatt | H01H 50/541 | |
| 11,699,864 | B2 * | 7/2023 | Harimochi | H01R 4/38 | 439/620.01 |
| 2015/0123753 | A1 | 5/2015 | Kawaguchi et al. | | |
| 2019/0311871 | A1 * | 10/2019 | Minowa | H01H 1/64 | |
| 2021/0082649 | A1 * | 3/2021 | Otsuka | H01H 50/045 | |

FOREIGN PATENT DOCUMENTS

| | | | |
|---|---|---|---|
| JP | 2014-86284 | A | 5/2014 |
| JP | 2018-163761 | A | 10/2018 |
| WO | 2012-165433 | A1 | 12/2012 |
| WO | 2014/080555 | A1 | 5/2014 |

OTHER PUBLICATIONS

The Written Opinion of the International Searching Authority of International Application No. PCT/JP2022/034675 issued on Nov. 8, 2022.

* cited by examiner

ELECTROMAGNETIC RELAY

CROSS-REFERENCE TO RELATED APPLICATION

This application is the U.S. National Phase of International Application No. PCT/JP2022/034675, filed on Sep. 16, 2022. That application claims priority to Japanese Patent Application No. 2021-173388, filed Oct. 22, 2021. The contents of those two applications are incorporated by reference herein in their entireties.

FIELD

The claimed invention relates to an electromagnetic relay.

BACKGROUND

Conventionally, an electromagnetic relay is known that includes a contact case in which a fixed contact and a movable contact piece are accommodated (see Japanese Patent Application Publication No. 2018-163761). The contact case is fixed to a yoke by means such as brazing or welding.

When the contact case is fixed by means such as brazing or welding, high component precision is required and the manufacturing costs increase.

SUMMARY

An object of the claimed invention is to provide an electromagnetic relay in which a contact case can be fixed at low cost.

An electromagnetic relay according to one aspect of the claimed invention includes a fixed terminal, a movable contact piece, a contact case, and a drive device. The fixed terminal includes a fixed contact. The movable contact piece includes a movable contact opposing the fixed contact. The contact case configured to accommodate the fixed contact and the movable contact piece. The drive device includes a fixed iron core to be screw-fastened to the contact case, and a yoke to be held between the fixed iron core and the contact case.

In the electromagnetic relay, the contact case is fixed to the fixed iron core by screw-fastening, and thereby the contact case can be fixed at a lower cost than when the contact case is fixed by means such as brazing or welding. Since the contact case can be fixed in a simple manner, the production efficiency of the electromagnetic relays is improved. Furthermore, compared to the case where the contact case is fixed by means such as welding, high component precision is not required. The yoke is held between the fixed iron core and the contact case, and thereby the contact case can be fixed to the yoke in a simple manner.

The drive device may further include a bottomed cylinder in which the fixed iron core is partially accommodated. The bottomed cylinder may be held between the fixed iron core and the yoke. In this case, the bottomed cylinder can be fixed with a simple configuration.

The electromagnetic relay may further include an elastic member disposed between the yoke and the contact case. In this case, the elastic member can decrease the possibility of loosening of the screw-fastening and also reduce the operating noise of the electromagnetic relay.

The fixed iron core may include a large-diameter portion, a small-diameter portion smaller in diameter than the large-diameter portion, and a male screw portion on an outer peripheral surface of the small-diameter portion. The contact case may include a female screw portion to be screw-fastened to the male screw portion. In this case, the fixed iron core can be screw-fastened directly to the contact case.

The electromagnetic relay may further include a reinforcing member. The reinforcing member may be disposed between the male screw portion of the fixed iron core and the female screw portion of the contact case to reinforce the female screw portion of the contact case. In this case, the female screw portion can be strengthened.

The electromagnetic relay may further include a screw member to be screwed to the fixed iron core. The contact case may be screw-fastened to the fixed iron core via the screw member. The contact case may be held between the fixed iron core and the screw member. In this case, the contact case can be screw-fastened to the fixed iron core using, for example, a nut.

The contact case may be prevented from rotating by the yoke. In this case, when the contact case and the fixed iron core are screw-fastened, the yoke can be used to decrease displacement of the contact case.

The yoke may include a plurality of protrusions for preventing the contact case from rotating. In this case, the contact case can be prevented from rotating with a simple configuration.

The contact case may include a locking recess to be locked by the plurality of protrusions. In this case, the contact case can be prevented from rotating with a simple configuration.

The plurality of protrusions may penetrate the contact case. In this case, displacement of the contact case can be further decreased by the yoke.

The contact case may include a rotation-preventing portion that is be prevented from rotation by a side portion of the yoke. In this case, the contact case can be prevented from rotating with a simple configuration.

DETAILED DESCRIPTION

Figure 1:
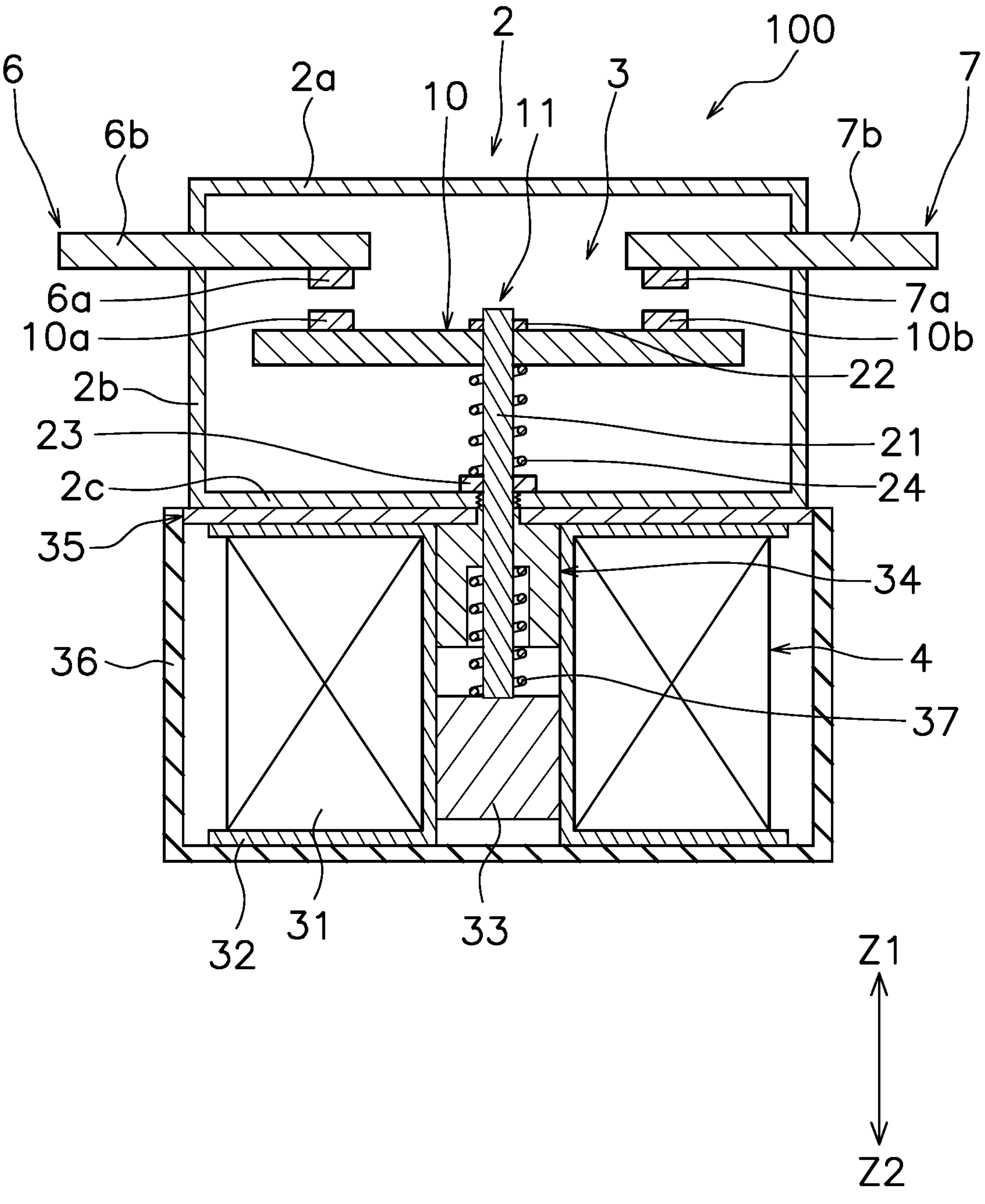
FIG. 1 is a schematic cross-sectional view of an electromagnetic relay in accordance with the claimed invention.

Hereinafter, one embodiment of an electromagnetic relay 100 according to one aspect of the claimed invention will be described with reference to the drawings. When referring to the drawings, for easier understanding of the description, the upper side in FIG. 1 will be referred to as "upper", the lower side as "lower", the left side as "left", and the right side as "right". In addition, a direction perpendicular to the paper plane of FIG. 1 will be described as a front-rear direction. These directions are defined for convenience of description, and do not limit the directions in which the electromagnetic relay 100 is arranged.

FIG. 1 is a schematic cross-sectional view of the electromagnetic relay 100. As shown in FIG. 1, the electromagnetic relay 100 includes a contact case 2, a contact device 3, and a drive device 4.

The contact case 2 has a substantially rectangular box shape and is comprised of insulating material such as resin. Note that the contact case 2 may be comprised of metal.

Figure 2:
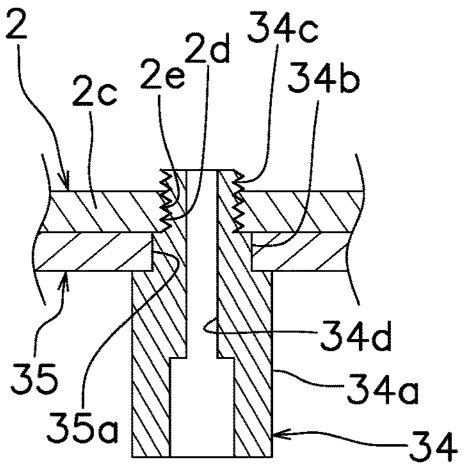
FIG. 2 is a schematic cross-sectional view of a fixed iron core and surrounding portions.

The contact case 2 includes a top surface portion 2*a*, side walls 2*b*, a bottom portion 2*c*, a through-hole 2*d* (see FIG. 2), and a female screw portion 2*e* (see FIG. 2). The top surface portion 2*a* has a rectangular shape when viewed from above. The side walls 2*b* extend downward from the front, rear, left, and right edges of the top surface portion 2*a*. The bottom portion 2*c* has a rectangular shape when viewed from above and faces the top surface portion 2*a* in the up-down direction. The bottom portion 2*c* is arranged below the top surface portion 2*a* and is connected to the side walls 2*b*. The through-hole 2*d* passes through the center of the bottom portion 2*e* in the up-down direction. The female screw portion 2*e* is formed on an inner surface of the through-hole 2*d*.

The contact device 3 includes a first fixed terminal 6, a second fixed terminal 7, a movable contact piece 10, and a movable mechanism 11.

The first fixed terminal 6 and the second fixed terminal 7 are plate terminals and extend in the left-right direction. The first fixed terminal 6 and the second fixed terminal 7 are spaced apart from each other in the left-right direction. The first fixed terminal 6 and the second fixed terminal 7 are comprised of conductive material such as copper.

The first fixed terminal 6 includes a first fixed contact 6*a* and a first external connection 6*b*. The first fixed contact 6*a* is accommodated in the contact case 2. The first fixed contact 6*a* is arranged on the lower surface of the first fixed terminal 6 within the contact case 2. The first fixed contact 6*a* may be integrated with the first fixed terminal 6. The first external connection 6*b* protrudes to the left from the side walls 2*b* of the contact case 2.

The second fixed terminal 7 includes a second fixed contact 7*a* and a second external connection 7*b*. The second fixed contact 7*a* is accommodated in the contact case 2. The second fixed contact 7*a* is arranged on the lower surface of the second fixed terminal 7 in the contact case 2. The second fixed contact 7*a* may be integral with the second fixed terminal 7. The second external connection 7*b* protrudes to the right from the side walls 2*b* of the contact case 2.

The movable contact piece 10 is a plate member that is long in one direction, and is comprised of conductive material such as copper. The movable contact piece 10 is accommodated in the contact case 2. The dimension of the movable contact piece 10 in the left-right direction is larger than the dimension of the movable contact piece 10 in the front-rear direction.

The movable contact piece 10 includes a first movable contact 10*a* and a second movable contact 10*b*. The first movable contact 10*a* is arranged at a position facing the first fixed contact 6*a*, and is configured to come into contact with the first fixed contact 6*a*. The second movable contact 10*b* is separated from the first movable contact 10*a* in the left-right direction. The second movable contact 10*b* is arranged at a position facing the second fixed contact 7*a*, and is configured to come into contact with the second fixed contact 7*a*. The first movable contact 10*a* and the second movable contact 10*b* may be integrated with the movable contact piece 10.

The movable contact piece 10 is configured to move in the direction in which the first movable contact 10*a* contacts the first fixed contact 6*a* (here, for example, upward) and in the direction in which the first movable contact 10*a* separates from the first fixed contact 6*a* (here, for example, downward).

The movable mechanism 11 includes a drive shaft 21, a first holding member 22, a second holding member 23, and a contact spring 24. The drive shaft 21 is coupled to the movable contact piece 10. The drive shaft 21 extends in the up-down direction and passes through the movable contact piece 10 in the up-down direction. The drive shaft 21 is arranged to move in the up-down direction.

The first holding member 22 is fixed to the drive shaft 21 above the movable contact piece 10. The second holding member 23 is fixed to the drive shaft 21 below the movable contact piece 10. The contact spring 24 is arranged between movable contact piece 10 and second holding member 23. The contact spring 24 urges the movable contact piece 10 upward via second holding member 23.

The drive device 4 is arranged below the contact device 3. The drive device 4 moves the movable contact piece 10 via the drive shaft 21 of the movable mechanism 11 by the electromagnetic force. The drive device 4 includes a coil 31, a spool 32, a movable iron core 33, a fixed iron core 34, a first yoke 35, a second yoke 36, and a return spring 37.

When excited by application of a voltage, the coil 31 generates an electromagnetic force which moves the movable iron core 33 upward. The spool 32 is cylindrical in shape, where the coil 31 is wound around the outer periphery. The movable iron core 33 is disposed inside the spool 32. The movable iron core 33 is connected to the drive shaft 21 so as to be integrally movable.

The fixed iron core 34 is arranged at a position facing the movable iron core 33. The fixed iron core 34 is disposed above movable iron core 33. The fixed iron core 34 is screw-fastened into contact case 2. The drive shaft 21 is disposed penetrating the fixed iron core 34 in the up-down direction. The drive shaft 21 is movable relative to the fixed iron core 34 in the up-down direction.

As shown in FIG. 2, the fixed iron core 34 includes a large-diameter portion 34*a*, a small-diameter portion 34*b*, a male screw portion 34*c*, and a through-hole 34*d*. The large-diameter portion 34*a* is disposed inside the spool 32. The large-diameter portion 34*a* is in contact with the first yoke 35 in the up-down direction. The small-diameter portion 34*b* protrudes upward from the upper portion of the large-diameter portion 34*a*. The small-diameter portion 34*b* has an outer diameter smaller than the outer diameter of the large-diameter portion 34*a*. That is, the dimension of the small-diameter portion 34*b* in the left-right direction is smaller than the dimension of the large-diameter portion 34*a* in the left-right direction. The small-diameter portion 34*b* is arranged to pass through the first yoke 35 and the through-hole 2*d* of the contact case 2 in the up-down direction.

The male screw portion 34*c* is formed on the tip outer peripheral surface of the small-diameter portion 34*b*. The male screw portion 34*c* is screwed to the female screw portion 2*e* of the contact case 2. With the configuration, the contact case 2 is fixed by screw-fastening to the fixed iron core 34. The through-hole 34*d* penetrates the centers of the large-diameter portion 34*a* and the small-diameter portion 34*b* in the up-down direction. The drive shaft 21 is disposed to pass through the through-hole 34*d*.

The first yoke 35 has a rectangular shape when viewed from above, and is arranged between the contact case 2 and the spool 32. The first yoke 35 covers the coil 31 from above. The upper surface of the first yoke 35 is in contact with the lower surface of the bottom portion 2*c* of the contact case 2. The first yoke 35 is held between the contact case 2 and the fixed iron core 34. Specifically, the first yoke 35 is held between the fixed iron core 34 and the contact case 2 in the up-down direction by the fastening force of screw-fastening between the contact case 2 and the fixed iron core 34.

The first yoke 35 has a through-hole 35*a* penetrating in the up-down direction. The through-hole 35*a* is arranged at a position overlapping the through-hole 2*d* of the contact case 2 in the up-down direction, and the small-diameter portion 34*b* of the fixed iron core 34 is positioned in the through-hole 35*a*. The through-hole 35*a* has an inner diameter smaller than the outer diameter of the large-diameter portion 34*a* of the fixed iron core 34. It is preferable that the gap between the through-hole 35*a* and the small-diameter portion 34*b* be small.

As shown in FIG. 1, the second yoke 36 has a U-shape when viewed from the front-rear directions. The second yoke 36 is arranged around the coil 31 and connected to the first yoke 35. The second yoke 36 covers the coil 31 from the left and right sides and from below.

The return spring 37 is arranged between the movable iron core 33 and the fixed iron core 34. The return spring 37 urges the movable iron core 33 downward.

Figure 3:
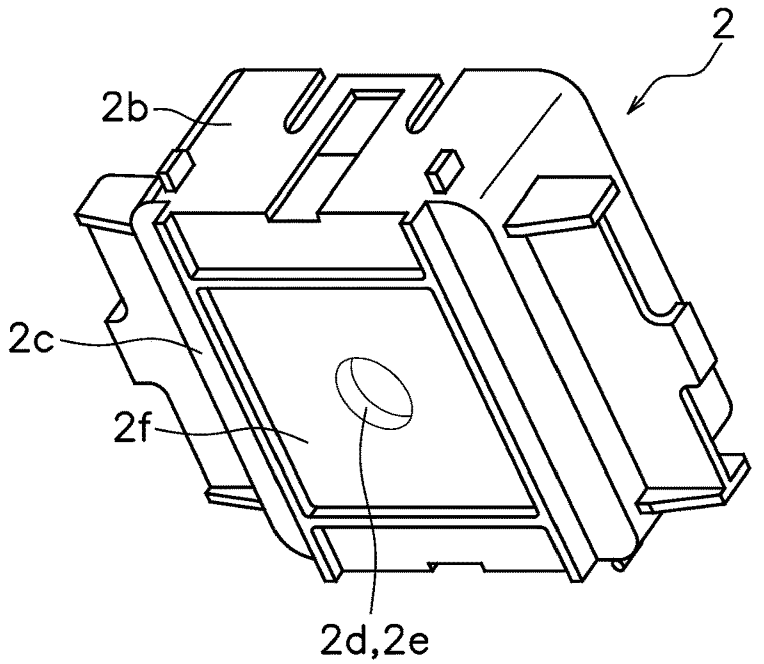
FIG. 3 is a perspective view of a contact case.
Figure 4:
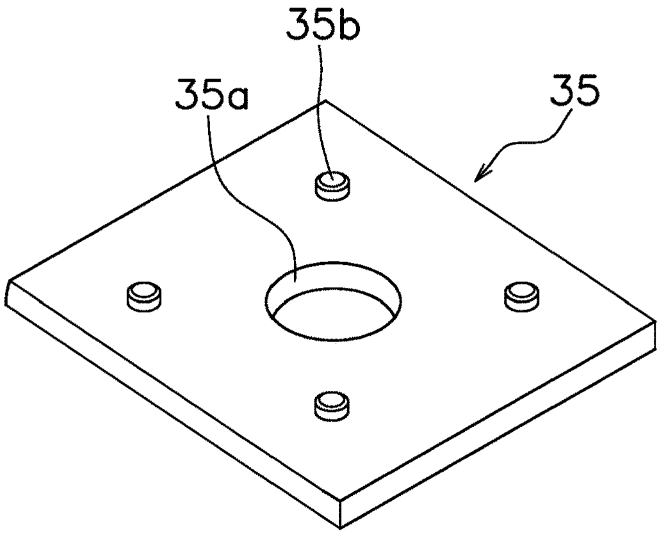
FIG. 4 is a schematic cross-sectional view of a fixed iron core and surrounding portions according to a modification.

FIG. 3 is a perspective view of the contact case 2. FIG. 4 is a perspective view of the first yoke 35. The contact case 2 is prevented from rotating by the first yoke 35. The contact case 2 is restricted from rotating around the drive shaft 21 by the first yoke 35. Specifically, the contact case 2 includes a locking recess 2*f*. The locking recess 2*f* is located on the lower surface of the bottom portion 2*c*. The locking recess 2*f* is in a shape recessed from the bottom toward the top. The locking recess 2*f* has a rectangular shape when viewed from below.

The first yoke 35 includes several (i.e., a plurality of) protrusions 35*b* (four here for example). The protrusions 35*b* are located on the upper surface of the first yoke 35. The protrusions 35*b* respectively contact the side surfaces of the locking recess 2*f* within the locking recess 2*f* so as to prevent the contact case 2 from rotating.

The operation of the electromagnetic relay 100 is the same as the conventional one, and the description will be omitted.

In the electromagnetic relay 100 with the above configuration, the contact case 2 is fixed to the fixed iron core 34 by screw-fastening, and thereby the contact case 2 can be fixed at a lower cost as compared to the case where the contact case 2 is fixed by means such as brazing and welding. Since the contact case 2 can be fixed in a simple manner, the production efficiency of the electromagnetic relay 100 is improved. Furthermore, compared to the case where the contact case 2 is fixed by means such as welding, high component accuracy is not required. Since the first yoke 35 is held between the fixed iron core 34 and the contact case 2, the contact case 2 can be fixed to the first yoke 35 in a simple manner.

One embodiment of the electromagnetic relay according to one aspect of the claimed invention has been described above. The claimed invention, however, is not limited to the above embodiment, and various changes can be made without departing from the scope of the claimed invention.

The shapes of the first fixed terminal 6 and the second fixed terminal 7 may be changed. For example, the first fixed terminal 6 and the second fixed terminal 7 may be column-shaped terminals. An electromagnetic relay 100 may further include a case for covering the contact case 2 from the outside. In the contact case 2, the side walls 2*b* and the bottom portion 2*c* may be composed of a single member, and the top surface portion 2*a* may be a separate member from the bottom portion 2*c* and the side walls 2*b*. In this case, the case may also serve as the top surface portion 2*a*. In the contact case 2, the top surface portion 2*a* and the side walls 2*b* may be composed of a single member, and the bottom portion 2*c* may be a separate member from the top surface portion 2*a* and the side walls 2*b*.

The configuration of the drive device 4 may be changed. For example, the first yoke 35 and the second yoke 36 may be arranged upside down in the up-down direction. In this case, the second yoke 36 is held between the fixed iron core 34 and the contact case 2 when the contact case 2 is screw-fastened to the fixed iron core 34.

Figure 5:
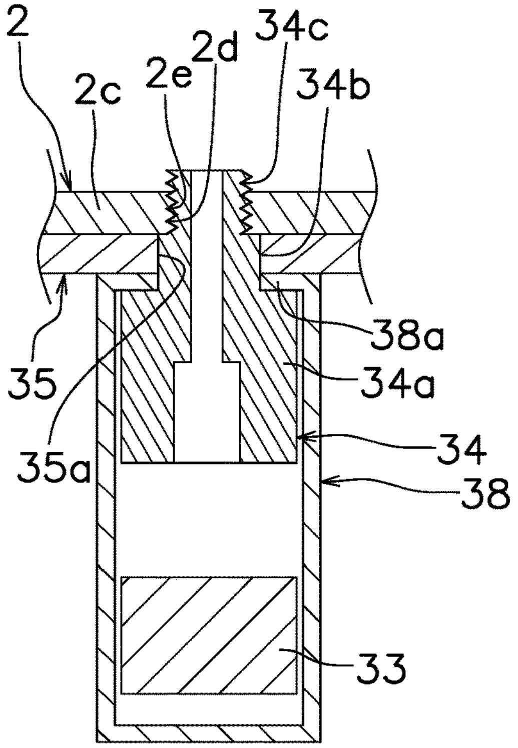
FIG. 5 is a schematic cross-sectional view of a fixed iron core and surrounding portions according to a modification.

As shown in FIG. 5, the drive device 4 may further include a bottomed cylinder 38. The bottomed cylinder 38 is arranged inside the spool 32 and accommodates the movable iron core 33 and the large-diameter portion 34*a* of the fixed iron core 34. The bottomed cylinder 38 is held and fixed between the first yoke 35 and the fixed iron core 34 when the contact case 2 and the fixed iron core 34 are screw-fastened together. Specifically, the bottomed cylinder 38 includes a clamped portion 38*a*. The clamped portion 38*a* extends toward the small-diameter portion 34*b* of the fixed iron core 34 at the upper end of the bottomed cylinder 38. The clamped portion 38*a* is held between the first yoke 35 and the large-diameter portion 34*a* of the fixed iron core 34 in the up-down direction. Note that, in FIG. 5 and the subsequent drawings, illustrations of the drive shaft 21 and the return spring 37 are omitted.

Figure 6:
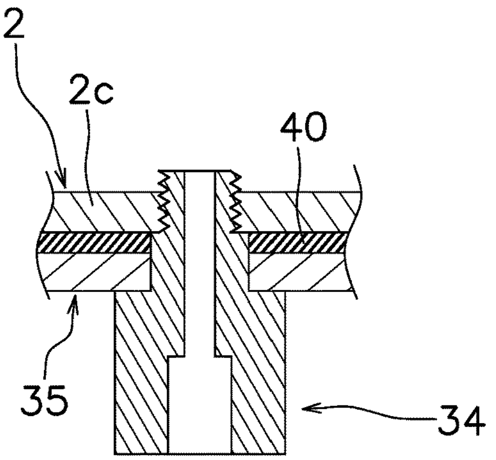
FIG. 6 is a schematic cross-sectional view of a fixed iron core and surrounding portions according to a modification.

As shown in FIG. 6, the electromagnetic relay 100 may further include an elastic member 40. The elastic member 40 is arranged between the first yoke 35 and the bottom portion 2*c* of the contact case 2. The elastic member 40 is an elastically deformable cushioning material such as rubber.

Figure 7:
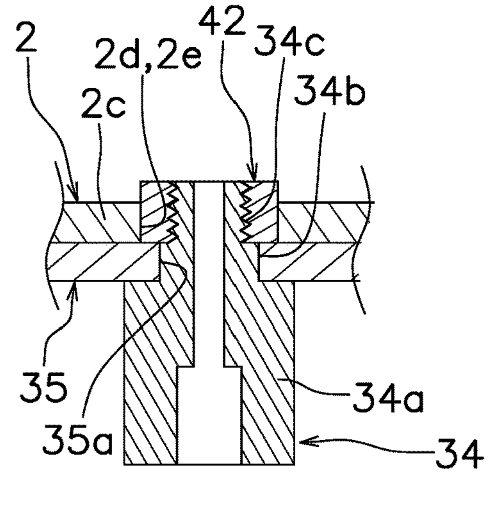
FIG. 7 is a schematic cross-sectional view of a fixed iron core and surrounding portions according to a modification.

As shown in FIG. 7, the electromagnetic relay 100 may further include a reinforcing member 42. The reinforcing member 42 is disposed between the male screw portion 34*c* of the fixed iron core 34 and the female screw portion 2*e* of the contact case 2, and reinforces the female screw portion 2*e* of the contact case 2. The reinforcing member 42 is, for example, a helical insert. Note that the female screw portion 2*e* of the contact case 2 may be formed by fitting a helical insert into the through-hole 2*d*.

Figure 8:
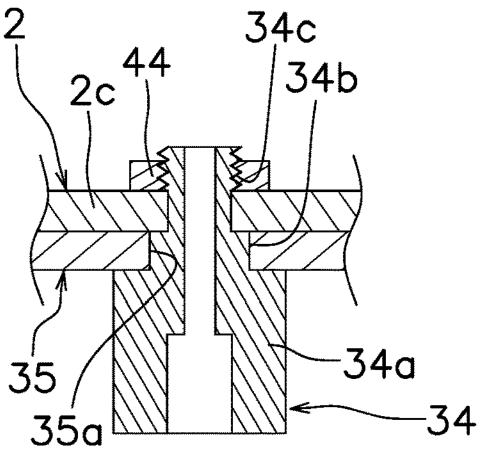
FIG. 8 is a schematic cross-sectional view of a fixed iron core and surrounding portions according to a modification.

As shown in FIG. 8, the contact case 2 may be screw-fastened to the fixed iron core 34 via a screw member 44 configured to be threaded with the male screw portion 34*c* of the fixed iron core 34. The screw member 44 is, for example, a nut having a female screw. In this case, the contact case 2 is held between fixed iron core 34 and screw member 44. Note that the screw member 44 may be fitted into the bottom portion 2*c* of the contact case 2. For example, the screw member 44 having a female screw may be insert-molded in the contact case 2.

In the above embodiment, the contact case 2 is prevented from rotating by bringing the protrusions 35*b* into contact with the side surfaces of the locking recess 2*f*. However, the structure for preventing the contact case 2 from rotating is not limited to the said embodiment. For example, the contact case 2 may include a structure corresponding to the protrusions 35*b*, and the first yoke 35 may include a structure corresponding to the locking recess 2*f*.

Figure 9:
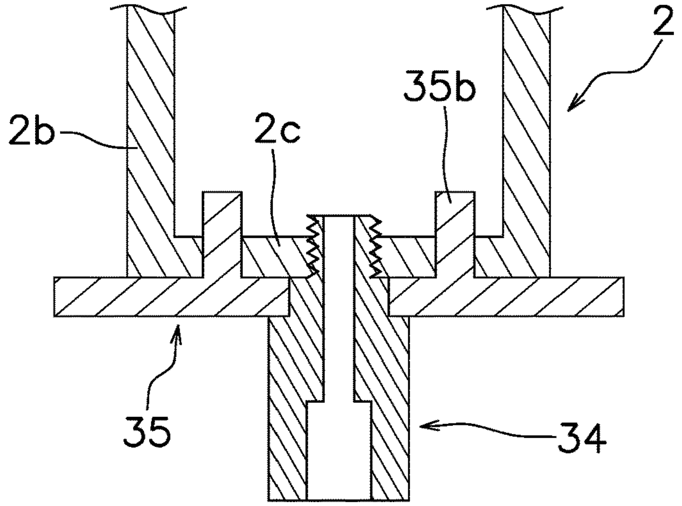
FIG. 9 is a schematic cross-sectional view of a fixed iron core and surrounding portions according to a modification.

As shown in FIG. 9, the protrusions 35*b* may penetrate the bottom portion 2*c* of the contact case 2 to prevent the contact case 2 from rotating. Note that the protrusions 35*b* do not necessarily need to penetrate the bottom portion 2*c* of the contact case 2. The protrusions 35*b* may have any shape as long as they engage with the bottom portion 2*c* of the contact case 2 to prevent the contact case 2 from rotating.

Figure 10:
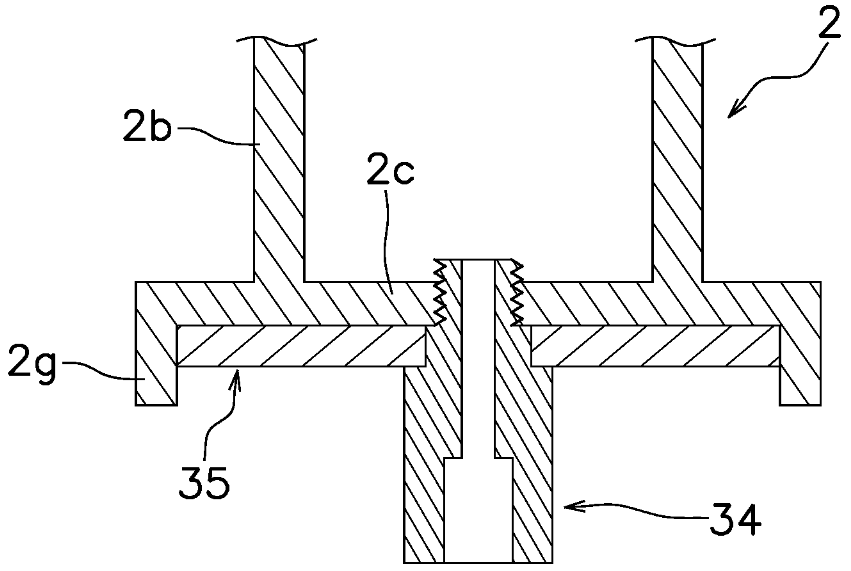
FIG. 10 is a schematic cross-sectional view of a fixed iron core and surrounding portions according to a modification.

As shown in FIG. 10, the contact case 2 may include a rotation preventing portion 2*g* that is prevented from rotation by a side of the first yoke 35. The rotation preventing portion 2*g* is located on the outside of the side of the first yoke 35. In the example shown in FIG. 10, a pair of rotation preventing portions 2*g* are positioned on the left and right sides.

An adhesive may be applied between the male screw portion 34*c* of the fixed iron core 34 and the female screw portion 2*e* of the contact case 2. Similarly, an adhesive may be applied between the first yoke 35 and the fixed iron core 34.

In the above embodiment, the contact case 2 includes the female screw portion 2*e*, and the fixed iron core 34 includes the male screw portion 34*c*. However, the configurations of the female screw portion 2*e* and the male screw portion 34*c* may be interchanged. That is, the contact case 2 may have a male screw portion, and the fixed iron core 34 may have a female screw portion. In this case, for example, a cylindrical portion connected to the through-hole 2*d* of the contact case 2 may project downward from the bottom portion 2*c* of the contact case 2, and the male screw portion may be positioned on the outer peripheral surface of the cylindrical portion.

REFERENCE NUMERALS

2: Contact case, 2*e*: Female screw portion, 2*f*: Locking recess, 2*g*: Rotation preventing portion, 4: Drive device, 6: First fixed terminal (Example of fixed terminal), 6*a*: First fixed contact (Example of fixed contact), 10: Movable contact piece, 10*a*: First movable contact (Example of a movable contact), 34: fixed iron core, 34*a*: Large-diameter portion, 34*b*: Small-diameter portion, 34*c*: Male screw portion, 35: First yoke (Example of yoke), 35*b*: A plurality of protrusions, 38: Bottomed cylinder, 40: Elastic member, 42: Reinforcing member, 100: Electromagnetic relay

The invention claimed is:

1. An electromagnetic relay comprising:
- a fixed terminal including a fixed contact;
- a movable contact piece including a movable contact opposing the fixed contact;
- a contact case configured to accommodate the fixed contact and the movable contact piece; and
- a drive device including
  - a fixed iron core to be screw-fastened to the contact case, the fixed iron core including a large-diameter portion, a small-diameter portion smaller in diameter than the large-diameter portion, and a male screw portion on an outer peripheral surface of the small-diameter portion, and
  - a yoke to be held between the fixed iron core and the contact case, the yoke including a through-hole, the small-diameter portion of the fixed iron core passing through the through-hole and the yoke being held between the large-diameter portion of the fixed iron core and the contact case, the contact case including a female screw portion to be threaded with the male screw portion.

2. The electromagnetic relay according to claim 1, wherein
- the drive device further includes a bottomed cylinder in which the fixed iron core is partially accommodated, and
- the bottomed cylinder is held between the fixed iron core and the yoke.

3. The electromagnetic relay according to claim 1, further comprising:
- an elastic member disposed between the yoke and the contact case.

4. The electromagnetic relay according to claim 1, further comprising:
- a reinforcing member disposed between the male screw portion of the fixed iron core and the female screw portion of the contact case to reinforce the female screw portion of the contact case.

5. The electromagnetic relay according to claim 1, further comprising:
- a screw member to be screwed to the fixed iron core, wherein
- the contact case is screw-fastened to the fixed iron core via the screw member, and
- the contact case is held between the fixed iron core and the screw member.

6. The electromagnetic relay according to claim 1, wherein the contact case is prevented from rotating by the yoke.

7. The electromagnetic relay according to claim 6, wherein the yoke includes a plurality of protrusions configured to prevent the contact case from rotating.

8. The electromagnetic relay according to claim 7, wherein the contact case includes a locking recess to be locked by the plurality of protrusions.

9. The electromagnetic relay according to claim 7, wherein the plurality of protrusions penetrates the contact case.

10. The electromagnetic relay according to claim 6, wherein the contact case includes a rotation preventing portion that is prevented from rotating by a side portion of the yoke.

* * * * *